Patented Aug. 25, 1942

2,294,306

UNITED STATES PATENT OFFICE 2,294,306

YELLOW PIGMENTIZING COMPOSITION AND PROCESS FOR PRODUCING THE SAME

Joseph W. Lang, Woodstown, N. J., assignor to E. I. du Pont de Nemours & Company, Wilmington, Del., a corporation of Delaware No Drawing. Application March 5, 1940, Serial No. 322,350

7 Claims. (Cl. 106—289)

This invention relates to processes for manufacturing improved yellow pigments and lakes comprising the product of coupling tetrazotized 3,3'-dichlorbenzidine with acetoacetanilide.

Pigments of similar qualitative composition which are relatively non-transparent are known. Processes have now been discovered which produce a product having sufficient transparency and tinting strength for use of the pigments in various compositions, such as printing inks for multicolor printing.

It is among the objects of the invention to provide improved transparent pigments and lakes comprising the product of coupling tetrazotized 3,3'-dichlorbenzidine with acetoacetanilide. Another object of the invention is to improve the tinctorial properties of compositions containing such products of coupling. Other objects of the invention will be apparent from the following description.

The objects of the invention are attained in general by a heat treatment of the precipitated color or lake before it is isolated from the medium in which it is formed.

The invention will be more fully set forth in the following more detailed description which includes examples that are given as illustrative embodiments of the invention and not as limitations thereof. Parts are expressed in parts by weight unless otherwise noted.

Example I

One hundred and sixty three parts of 3,3'-dichlorbenzidine hydrochloride were slurried in 1500 parts of water and 73 parts of 100% hydrochloric acid. When smooth and free from lumps the slurry was iced to 5° C. and tetrazotized in the usual manner by the addition of 69 parts of sodium nitrite. When tetrazotization was complete the solution was clarified by adding charcoal and then filtered.

One hundred fifty parts of wood rosin were dissolved in a container by boiling the rosin in a solution of 3000 parts of water and 30 parts of caustic soda. When solution was complete it was run into a boiling solution containing 100 parts of barium chloride dissolved in 2500 parts of water. The precipitate of barium rosinate was allowed to settle and the supernatant liquor was removed by decantation. 180 parts of acetoacetanilide, and 310 parts of sodium acetate and sufficient hydrochloric acid to render the slurry slightly acid to blue litmus paper were added. The temperature was adjusted to 25° C. and the tetrazo solution was slowly added with stirring over a period of 30 minutes. Upon completion of the coupling the mass was stirred for a short period of time and then heated to 70° C. at the rate of 2° C. per minute. The color was filtered, washed free of acid and dried at 60° C.

The dry color was tested in printing ink and compared with a color prepared from the same components by a similar process except that the color was not heat treated after it was formed. It was found that the heat treated product was a much more transparent pigment and had greater tinting strength than the untreated composition. It was also greener and brighter in tint. Maximum transparency was obtained by heating the composition to temperatures between 60° C. and 80° C. When heated to temperatures below about 60° C. the pigment did not develop the desired transparency and when heated above about 80° C. the transparency which may have been developed during the time which the temperature of the medium was within the desired temperature range appeared to be lost.

Example II

The tetrazo prepared from 163 parts of 3,3'-dichlorbenzidine in accordance with Example I was coupled to acetoacetanilide which was prepared as follows: 180 parts of acetoacetanilide were slurried in 1500 parts of water containing 310 parts of sodium acetate. The temperature was adjusted to 25° C. and the slurry was made slightly acid to blue litmus paper by the addition of a small amount of hydrochloric acid. The tetrazo was then slowly added to the slurry over a period of 30 minutes. Upon completion of the coupling the pigment slurry was heated to 70° C. at the rate of about 2° per minute, filtered, washed and dried.

As compared with the same pigment which was not heated, one which was heated to 50° C. and one which was heated to 90° C. prior to isolation, the product was much more transparent when tested in printing inks.

The advantages of the invention are attained when any substratum is used instead of barium rosinate, such as other insoluble rosinates, alkaline earth salts of rosin, various known derivatives of rosin and resins, aluminum hydrate, clays, bentonite, titanium dioxide and barium sulfate. For the best transparency the relatively transparent or light transmitting substrata, such as the insoluble rosinates, aluminum hydrate and the more transparent clays are preferred. Substrata, such as barium sulfate are not transparent but the improved tinctorial strength, brightness and greenness of shade are attained when non-transparent substrata are present as well as when no substratum is present or the substratum is transparent. The products obtained by heating to 70° C. are darker in masstone but greener and brighter and stronger in printing tone and tint. Heating to about 70° C. is preferred where a product having these characteristics in greatest degree is desired, either in substance or with substratum. The improvement in a narrow range approximating 70° C. is marked. It is preferred to dry the products at temperatures not exceeding about 80° C. but somewhat higher temperatures, say 100° C. for short drying periods, can be used.

The exact reasons for the improvements in the products attained by the invention are not known. There is a possibility that the described process effects an allotropic modification of the product which is originally precipitated or that a hydrated form of crystal is produced. The formation of an allotropic form appears to be supported by an experiment in which the product was heated in a drying oven for a prolonged time at a temperature considerably above 80° C. In this experiment the transparency of the color was impaired without a loss in weight which would be expected if the compound were a hydration product. It is to be understood that the invention is not restricted to the suggested theory.

It is not necessary to precipitate the color on the lake but fewer operations are required in making standardized products and homogeneity is attained more conveniently with precipitation on the substratum. The improvements are attained in lakes with all proportions of substrata and the invention is not restricted to any given proportion of the substratum. The most transparent compositions are those in which the color is precipitated on a transparent substratum and then heated within the described temperature range. For printing inks such products are preferred.

From the foregoing disclosure it will be recognized that the invention is susceptible of modification without departing from the spirit and scope thereof and it is to be understood that the invention is not restricted to the specific illustrations thereof herein set forth.

I claim:

1. The process which comprises coupling tetrazotized 3,3'-dichlorbenzidine with two mole equivalents of acetoacetanilide in a medium which is slightly acid to litmus, and heating the product of coupling in said medium from about 25° C. to a temperature range of about 60° C. to about 80° C. at a rate of about 2° C. per minute.

2. The process which comprises coupling tetrazotized 3,3'-dichlorbenzidine with two mole equivalents to acetoacetanilide in a medium which is slightly acid to litmus, and heating the product of coupling in said medium from about 25° C. to a temperature range of about 60° C. to about 80° C. at a rate of about 2° C. per minute, separating the solids and drying at a temperature not in excess of about 80° C.

3. The process which comprises precipitating on a substratum and in a coupling medium which is slightly acid to litmus, the product of coupling tetrazotized 3,3'-dichlorbenzidine with acetoacetanilide, and heating the precipitated product in said coupling medium from about 25° C. to a temperature range of about 60° C. to about 80° C. at a rate of about 2° C. per minute.

4. The process which comprises precipitating on a relatively transparent substratum and in a coupling medium which is slightly acid to litmus, the product of coupling tetrazotized 3,3'-dichlorbenzidine with acetoacetanilide; heating the precipitated product in said coupling medium from about 25° C. to a temperature range of about 60° C. to about 80° C. at a rate of about 2° C. per minute and then drying at a temperature not exceeding about 80° C.

5. The process which comprises precipitating on a relatively transparent substratum consisting of an insoluble rosinate and in a coupling medium which is slightly acid to litmus, the product of coupling tetrazotized 3,3'-dichlorbenzidine with acetoacetanilide; heating the precipitated product in said coupling medium from about 25° C. to a temperature range of about 60° C. to about 80° C. at a rate of about 2° C. per minute; and then drying at a temperature not exceeding about 80° C.

6. The process which comprises precipitating on a relatively transparent substratum consisting of barium rosinate and in a coupling medium which is slightly acid to litmus, the product of coupling tetrazotized 3,3'-dichlorbenzidine with acetoacetanilide; heating the precipitated product in said coupling medium from about 25° C. to a temperature range of about 60° C. to about 80° C. at a rate of about 2° C. per minute; and then drying at a temperature not exceeding about 80° C.

7. The process which comprises mixing about 180 parts of acetoacetanilide and 310 parts of sodium acetate into a hydrous slurry containing about 150 parts of barium rosinate, making the slurry slightly acid to litmus, adding about one half mole equivalent of tetrazotized 3,3'-dichlorbenzidine in said medium to couple with said acetoacetanilide, heating the resulting product in said coupling medium from about 25° C. to about 70° C. at a rate of about 2° C. per minute, separating the precipitate and drying at about 60° C. to about 80° C.

JOSEPH W. LANG.